United States Patent [19]

Kawamura et al.

[11] Patent Number: 4,933,697
[45] Date of Patent: Jun. 12, 1990

[54] CAMERA

[75] Inventors: Kunio Kawamura; Toshihiko Taniguchi, both of Sakai; Tetsuro Oya, Minamikawachi; Masatake Niwa, Sakai; Masaaki Nakai, Kawachinagano; Akihiko Fujino, Sakai, all of Japan

[73] Assignee: Minolta Camera Kabushiki Kaisha, Osaka, Japan

[21] Appl. No.: 307,749

[22] Filed: Feb. 8, 1989

Related U.S. Application Data

[63] Continuation of Ser. No. 882,363, Jul. 7, 1986, Pat. No. 4,853,726.

[30] Foreign Application Priority Data

| Jul. 10, 1985 | [JP] | Japan | 60-152825 |
| Jul. 10, 1985 | [JP] | Japan | 60-152645 |
| Jul. 10, 1985 | [JP] | Japan | 60-152646 |
| Jul. 10, 1985 | [JP] | Japan | 60-152647 |
| Jul. 11, 1985 | [JP] | Japan | 60-106552[U] |

[51] Int. Cl.$^5$ .............................................. G03B 17/02
[52] U.S. Cl. ........................... 354/289.1; 354/289.12
[58] Field of Search ............... 354/289.1, 441–445, 354/412, 429, 431, 432, 433, 434, 486, 289.1, 289.11, 289.12

[56] References Cited

U.S. PATENT DOCUMENTS

| 4,483,601 | 11/1984 | Sekida et al. | 354/289.1 |
| 4,598,986 | 7/1986 | Shiratori et al. | 354/289.1 |
| 4,687,308 | 8/1987 | Someya | 354/289.1 |
| 4,710,008 | 12/1987 | Tosaka et al. | 354/289.1 |

Primary Examiner—L. T. Hix
Assistant Examiner—David M. Gray
Attorney, Agent, or Firm—Watson, Cole, Grindle & Watson

[57] ABSTRACT

This invention is directed to a camera which has an information setting device including an information setting member rotatable around a display device. The information setting member is provided with a window member which covers the display device and through which the indiciation displayed on the display device can be seen. The display device is supported on a frame which defines a camera body in association with a cover member surrounding the frame, while the information setting device is supported on the cover member. Accordingly, the size of both devices can be made large without necessity of enlarging the camera body in proportion to the size of the devices. Further, both devices can be assembled independently from each other. Namely, the information setting device is mounted on the cover member which is still separated from the frame. Meanwhile, the display device is mounted on the frame. Finally, the cover member with the information setting device and frame with the display device are assembled. Accordingly, the devices are easily assembled, inspected and adjusted.

7 Claims, 8 Drawing Sheets

CAMERA

This application is a continuation application of application Ser. No. 882,363, filed 07/07/86 now U.S. Pat. No. 4,853,726.

BACKGROUND INVENTION

1. Field of the Invention

The present invention relates to a camera having setting devices, such as an exposure mode selecting device, exposure controlling device and, a light metering mode selecting device and a display device for displaying the exposure information applied into the above devices.

2. Description of the Prior Art

Conventionally, in an outer wall member, particularly in an upper portion of the outer wall member, of the camera body are mounted information setting devices, such as an exposure mode selecting device for selecting one of a shutter-priority automatic exposure mode, aperture-priority automatic exposure mode and programmed exposure mode, devices for controlling or adjusting the shutter speed and aperture, and a display device for displaying the exposure information applied into the above devices and the other various information such as a number of frames which has been taken and film sensitivity automatically read from a corresponding code on a film cartridge. In this case, the information setting devices and display devices as described above are often mounted on the same plane of the outer wall member of the camera body.

According to the prior art, as described above, a relatively large space for installation is required in order for both information setting devices and display devices to be mounted on the wall member of the camera body. Specifically, in the case that both setting devices and display devices are required to be as large as possible in order for them to be quickly and comfortably accessible to the user, a large space for installation, is necessary. The camera, however, is generally desired to be made as small as possible. Accordingly, it is desired that the mount area to be occupied by both information setting devices and display devices can be reduced.

Furthermore, according to the prior art, the outer wall member is generally made from covers which define the camera body together with a frame surrounded thereby. In this case, a display panel of the display devices and also an operation knob of the information setting devices are respectively mounted on the covers. This is because the display panel should face the outside and the operation knob should be exposed to the outside for manual operation. Contrary to the above, the other members of the display devices and the other members of the information setting devices are respectively mounted on the frame. With this construction, the display devices and information setting devices have to be inspected and adjusted after these devices have been incorporated into the covers and frame and also the covers and frame are assembled together. Accordingly, the operation for the inspection and adjustment consumes a large amount of time.

SUMMARY OF THE INVENTION

An object of the present invention is to provide a camera which has an information setting device, which is easily operated, and a display device, which is easily observed and can be made compact in size.

Another object of the present invention is to provide a camera which has an information setting device and display device which are, respectively, easily assembled, inspected and adjusted.

In accomplishing these and other objects, according to the present invention, there is provided a camera which has an information setting device including an information setting member rotatable around a display device. The information setting member is provided with a window member which covers the display device and through which the indication indicated on the display device can be seen. The display device is supported on a frame which defines a camera body in association with the cover member surrounding the frame, while the information setting device is supported on the cover member.

With the camera as described above, when the information device is made large in size, its window can be made large. Accordingly, the display device can be also made large in size. That i$ to say, the size of both devices can be made large without necessity of enlarging the camera body in proportion to the size of the enlarged devices. Further, both devices can be assembled independently of each other. Namely, the information setting device is mounted on the cover member which is still separated from the frame. Meanwhile, the display device is mounted on the frame. Finally, the cover member with the information setting device and frame with the display device are assembled. Accordingly, both devices can be easily assembled, inspected and adjusted.

BRIEF DESCRIPTION OF THE DRAWING

The above objects and features of the present invention will become apparent from the following description taken in conjunction with the preferred embodiment thereof, with reference to the accompanying drawings, in which.

DETAILED DESCRIPTION OF THE INVENTION

Figure 1:
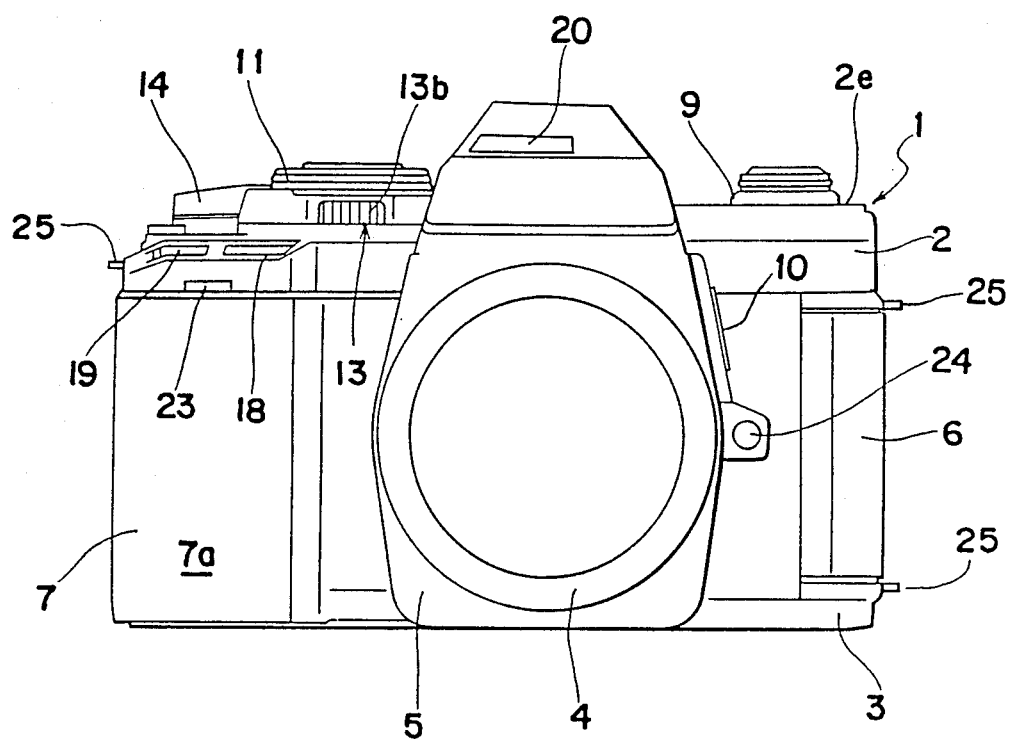
FIGS. 1 and 2 are, respectively, front and top plan views of a camera according to a preferred embodiment of the present invention.

Before the description of the present invention proceeds, it is to be noted that like parts are designated by like reference numerals and symbols throughout several views of the accompanying drawings.

Figure 2:
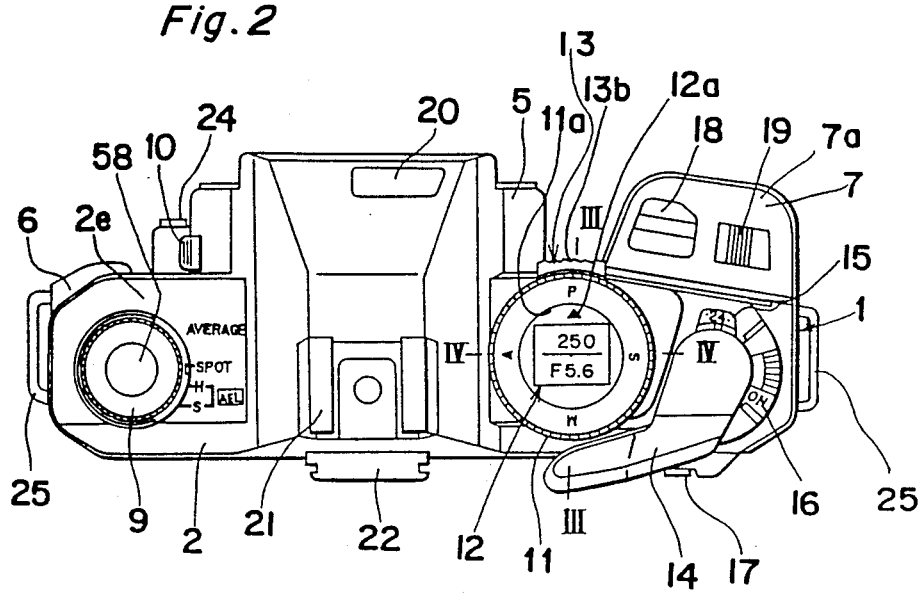
Figure 3:
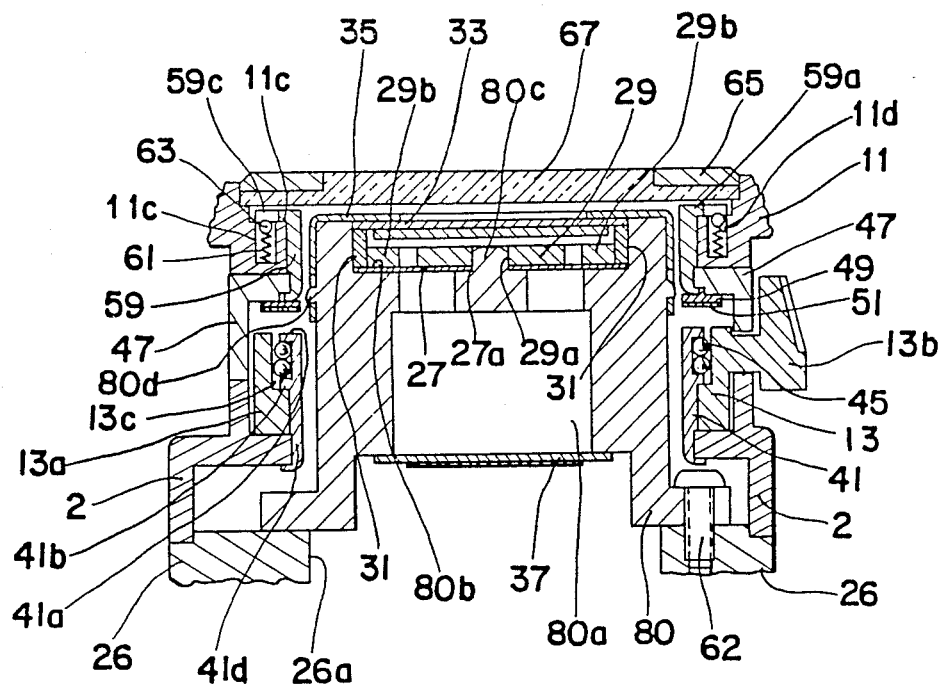
FIGS. 3 and 4 are, respectively, enlarged sections taken along lines III-III and IV-IV in FIG. 2.

Referring to FIGS. 1 and 2, a camera according to one preferred embodiment of the present invention is shown. The camera body 1 has upper and lower covers 2 and 3 respectively covering the upper and lower portions thereof, a front cover 5 covering the front portion thereof and having a lens mount ring 4, and side covers 6 and 7 covering the lateral portions thereof, i.e. a film chamber portion and a spool chamber portion. The side cover 7 has a front grip portion 7a which protrudes forwardly and defines a battery chamber therein.

A rewind knob 9 for rewinding the film is arranged on the upper cover 2 at the side of the film chamber. The rewind knob 9 also serves as a selector knob for selecting the light metering mode including, for example, an average metering mode and a spot metering mode with highlight and shadow based light metering modes. Such modes to be selected by the rewind knob 9 are indicated on the top surface 2e of the upper cover 2 by such symbols as "AVERAGE", "SPOT", "H" and "S". An adjusting knob 10 is arranged on the front cover 5 for the purpose of adjusting the exposure value (e.g. shutter speed, aperture value) and other informations.

Meanwhile, on the upper cover 2 at the side of spool chamber, an exposure mode selecting ring or knob 11 is rotatably arranged. The exposure mode includes a programmed exposure mode "P", manual exposure mode "M", shutter-priority automatic exposure mode "S" and aperture-priority automatic exposure mode "A". The symbols of these modes are indicated on the upper surface of the ring 11. A liquid crystal display unit 12 for indicating the exposure information such as shutter speed and aperture, i.e. F number, is accommodated in the upper cover 2 and below the ring 11. An adjusting ring or knob 13 is arranged coaxially with the exposure mode selecting ring 11 for the purpose of adjusting the exposure value (e.g. shutter speed, aperture value) and other informations.

On the top of the upper cover 2 adjacent to the exposure mode selecting ring 11 are arranged a film-advance lever 14, additive frame counter 15 and main switch 16. An AE lock button 17 of an AE lock switch is arranged on the backside of the upper cover 2.

A shutter release button 18 and self-timer operation knob 19 are arranged, parallel to each other, on the top of the grip portion 7a. In addition, in FIGS. 1 and 2, an LCD illumination window, accessory shoe, eye piece an LED indicator for self-timer, a lens release button and strap eyelets are respectively designated by reference numerals "20", "21", "22", "23", "24" and "25".

Referring to FIGS. 3 to 8, the exposure mode selecting unit 57 including the ring 11, the exposure value adjusting unit 56 including the adjusting ring 13, and the liquid crystal display unit 12 are shown.

Figure 4:
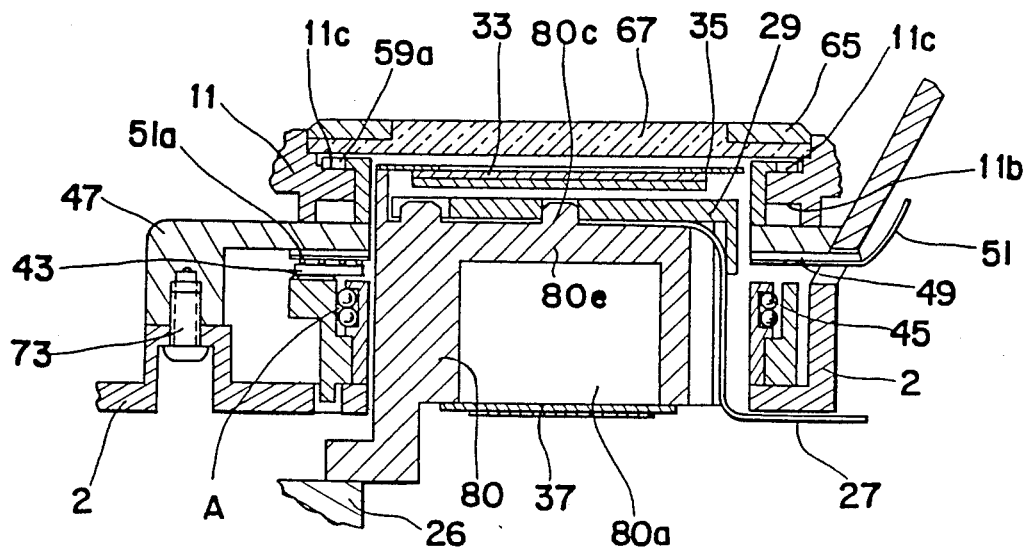

The display unit 12 is mounted on a frame 26 of the body 1, the frame being surrounded by several covers 2, 3, 5, 6 and 7. The display unit 12 has a cylindrical support member 80 which is fixed on the corresponding portion of the frame 26 by means of set screws 62 so as to cover an opening 26a formed in the frame 26. The support member 80 has an upper wall portion 80e which defines a recess 80b and a bore 80a. In the recess 80b, the end portion of a flexible printed circuit board 27, fixing plate 29 for depressing the printed circuit board 27 toward the wall portion 80e and a liquid crystal panel 33 are inserted. On the top surface of the wall portion 80e are integrally formed a pair of projections 80c, which are so designed as to pass through the positioning holes 27a of the printed circuit board 27 and the positioning holes 29a of the fixing plate 29. The fixing plate 29 has a pair of resilient arms 29b which resiliently press the inner peripheral surface of the recess 80b with corresponding connectors 31 interposed therebetween so that the fixing plate 29 can be held in the recess 80b. The fixing plate 29 also has a L-shaped arm 29c which forces the flexible printed circuit board 27 to extend along the outer peripheral surface of the support member 80, as best shown in FIG. 4.

A liquid crystal panel 33 is located on the pair of connectors 31 which electrically connect the contacts of the liquid crystal panel 33 and the contacts of the flexible printed circuit board 27 to each other.

A press plate 35 is positioned on the liquid crystal panel 33. The press plate 35 has two pairs of legs 35b which extend downwardly and respectively have positioning holes 35c into which the corresponding projections 80d are inserted so that the press plate 35 is fixed to the support member 80. Accordingly, the liquid panel 33 is depressed toward the connectors 31 to ensure the mutual electrical connection of the members 33, 31 and 27. The press plate 35 also has a rectangular opening 35a which permits the panel 33 to be seen therethrough, and a pointer 12a, i.e. a printed triangle mark, indicated on a corresponding position of the upper surface thereof. When the exposure mode selecting ring 11 is turned such that the index "P", for example, arrives at the pointer 12a, the programmed exposure mode can be selected. In addition, in the bore 80a is mounted a piezoelectric buzzer 37 which can generate a warning sound informing such a condition that the shutter speed is set so low as to tend to cause the blur, and counting sound informing such a condition that the self-timer is set. Such sound can be amplified in the bore 80a which can serve as a resonator.

Subsequently, the exposure value adjusting unit 56 and the exposure mode selecting unit 57 are described in detail herebelow.

The adjusting ring 13 of the exposure value adjusting unit 56 is arranged around the liquid crystal display unit 12 and supported on the upper cover 2. The exposure value adjusting unit 56 comprises the adjusting ring 13, as described above, and a cylindrical shaft 41 which surrounds the support member 80 of the liquid crystal display unit 12 and around which the adjusting ring 13 is rotatably mounted. The upper cover 2 has a circular opening 2a including a pair of notches 2b, an arcuate slit 2c located adjacent to the opening 2a, and a pair of projections 2d. The adjusting ring 13 is substantially cylindrical and comprises a sleeve portion 13a and a operation knob 13b. The sleeve portion 13a has an annular groove 13c on the inner surface thereof in which a return spring 45 is inserted. A pair of notches 13d and 13e spaced from each other are formed in the upper edge of the sleeve portion 13a. One of side edges 13f of one notch 13d and one of side edges 13g of the other notch 13e, which are remote from each other, engage, respectively, with the corresponding end portion 45a and 45b of the return spring 45. The sleeve portion 13a also has a lug 13h which extends downwardly from the bottom of the sleeve portion 13a to be inserted into the arcuate slit 2c so that the adjusting ring 13 can be turned within the length of the slit 2c. In addition, a brush 43 is fixed on a suitable portion of the upper edge of the adjusting ring 13.

The cylindrical shaft 41 has an upper flange portion 41a and middle flange portion 41b on the outer cylindrical surface. A pair of lugs 41d extending downwardly from the bottom of the shaft 41 is inserted into the opening 2a of the upper cover 2 and fixed thereto. The middle flange portion 41b is engaged with the shoulder portion of the groove 13c. The upper flange portion 41a has a diameter larger than that of the middle flange portion 41b so that the return spring 45 of a coil spring type is prevented from disengaging upwardly from the cylindrical shaft 41. A chamber A is formed by the lower surface of the upper flange portion 41a, the upper surface of the middle flange portion 41b, the outer cylindrical surface of the shaft 41 and the inner surface of the adjusting ring 13 to accommodate the return spring 45 therein.

Both end portions 45a and 45b of the return spring 45 accommodated in the chamber A respectively outwardly extend through the corresponding notches 13d and 13e to resiliently contact the corresponding edges 13f and 13g and the projections 2d and 2d.

Figure 5:
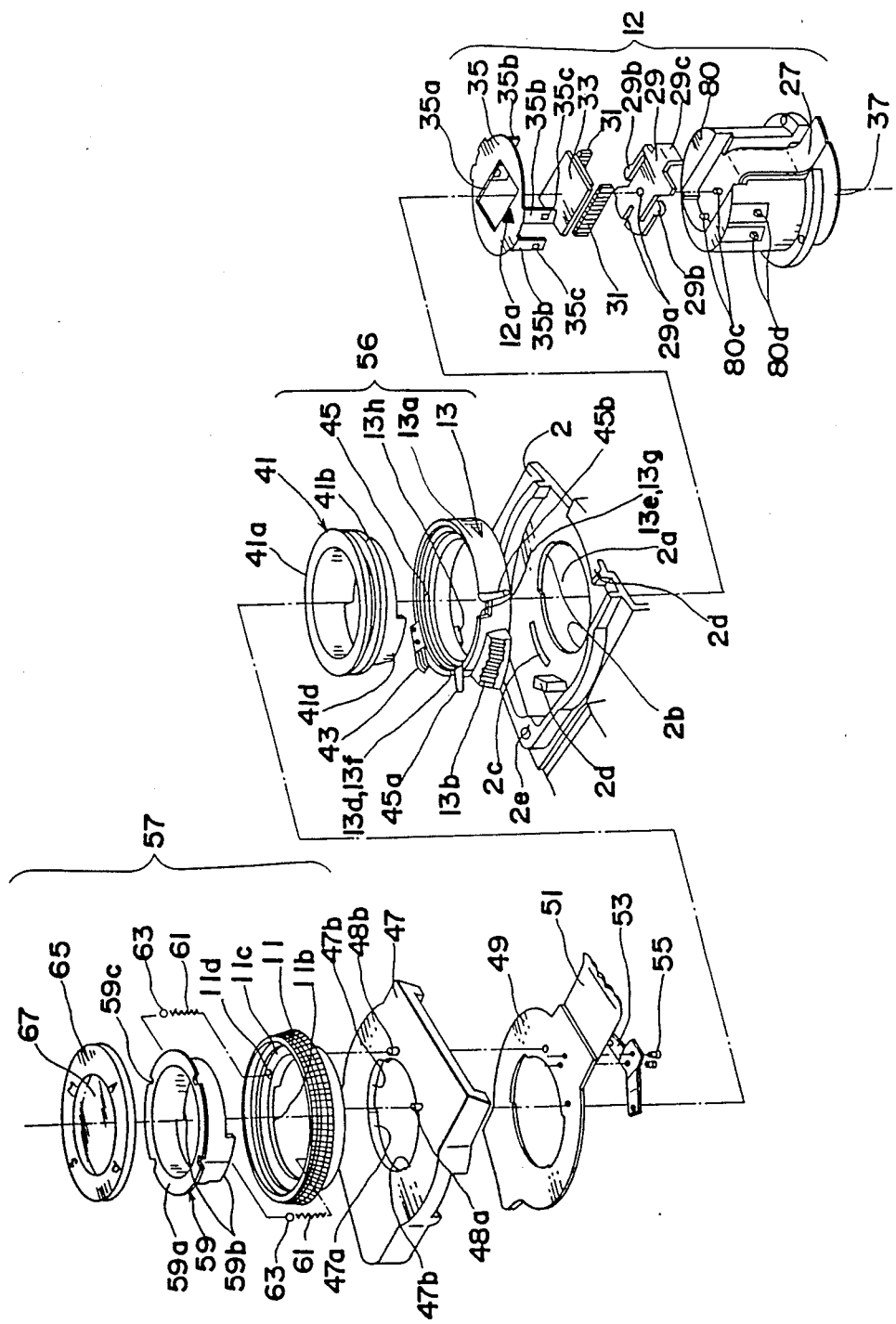
FIG. 5 is a exploded perspective view of a display unit, exposure value setting unit and exposure mode selecting unit as shown in FIGS. 3 and 4.
Figure 6:
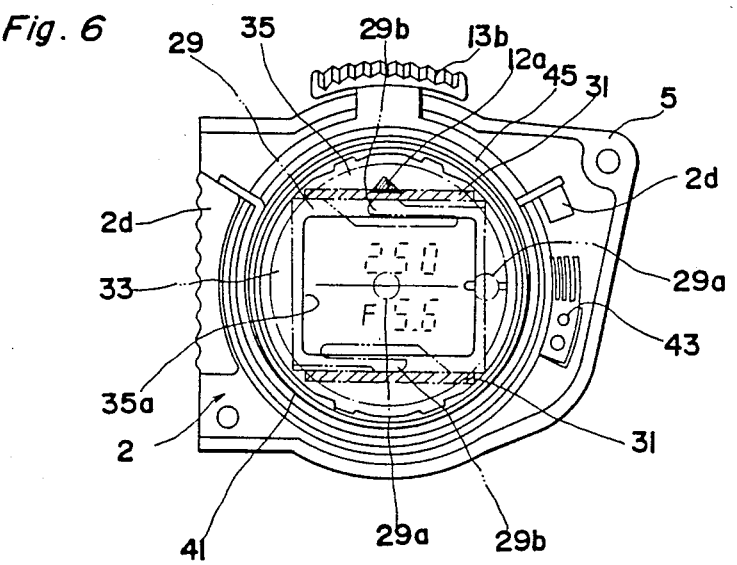
FIG. 6 is a top plan view of the camera shown in FIGS. 3 and 4.
Figure 7:
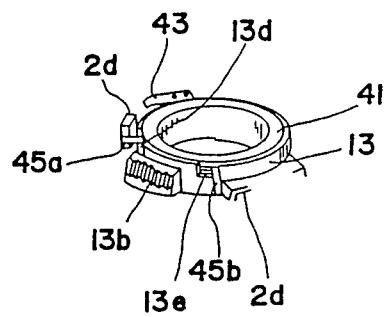
FIG. 7 is a perspective view of the exposure value setting unit shown in FIGS. 3 to 6, which has been assembled on an upper cover of the camera.

The process of assembling the exposure value adjusting unit 56 is described hereinbelow with reference to FIGS. 5 and 7.

The return spring 45 is first incorporated into the adjusting ring 13. Namely, for instance, one end portion 45a is first engaged with the edge 13f of the notch 13d and subsequently, by handling the other end portion 45b of the return spring 45, the entire return spring 45 is inserted into the interior of the adjusting ring 13 with the return spring 45 charged, and finally, the other end portion 45b of the return spring 45 is engaged with the other notch 13e. In this condition, since the return spring 45 is charged to some extent, the spring 45 expands in the annular groove 13c of the adjusting ring 13 so as to resiliently contact the inner surface of the ring 13. Subsequently, the shaft 41 is inserted into the control ring 13 with the return spring 45. In this condition, the return spring 45 is prevented from coming off the exposure value adjusting unit 56. Finally, the lugs 41d of the shaft 41 are fitted into the notches 2b of the upper cover 2 and fixed thereto. Accordingly, the exposure value adjusting unit 56 can be easily assembled.

The exposure mode selecting unit 57 includes a support member 47 which is fixed on the upper plate 2 by means of the set screws 73. A sleeve type shaft 59 is fixed on the support member 47. The exposure mode selecting ring 11 is rotatably mounted around the shaft 59 and on the support member 47. The ring 11 is provided with a transparent plate 67, on the peripheral portion of which an annular index plate 65 is mounted. Meanwhile, a flexible printed circuit board 51 is fixed on the lower surface of the support member 47.

The support member 47 has an opening 47a with a pair of notches 47b, and is provided with a pair of pins 48a and 48b adjacent to the opening 47a which slidably passes through the corresponding holes formed herein.

Figure 8:
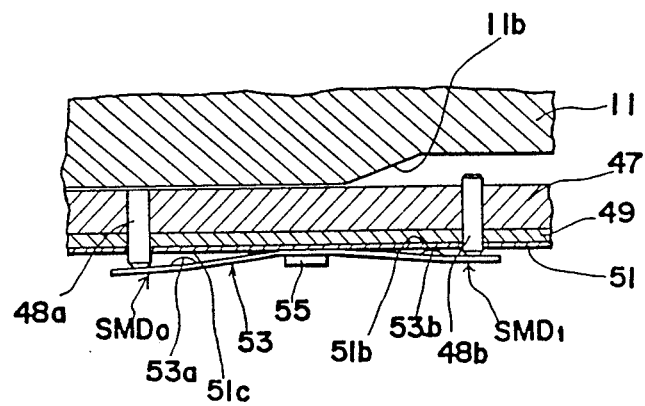
FIG. 8 is an enlarged sectional view of an essential portion of the exposure mode selecting unit shown in FIGS. 3 to 6.

The end portion of the flexible printed circuit board 51 is annular shaped and supported by an annular reinforcement plate 49 which is secured to the support member 47. The flexible printed circuit board 51 is provided, on the lower surface thereof, with first and second fixed contacts 51c and 51b which cooperate with contact member 53. Namely, as best shown in FIG. 8, the contact member 53 is made from a leaf spring and is secured to the flexible printed circuit board 51 as well as the reinforcement plate 49 at the middle portion thereof by means of a rivet 55. Furthermore, the contact member 53 has, at the end portions thereof, a pair of contacts 53a and 53b which respectively form the switches SMD0 and SMD1 in cooperation with the fixed contacts 51c and 51b on the flexible printed circuit board 51. The pins 48a and 48b are located in such positions as to be able to push the end portions of the contact member 53 so that the contacts 53a and 53b separate from the corresponding contacts 51c and 51b. When the pin 48a is depressed, the contact 53a separates from the corresponding fixed contact 51c so that the switch SMD0 turns off. Meanwhile, when the other pin 48b is depressed, the other contact 53b separates from the corresponding fixed contact 51b so that the switch SMD1 turns off.

The switches SMD0 and SMD1 serve as exposure mode selecting means and are operated in the manner as shown in the following Table 1.

TABLE 1

|      | P   | A   | S   | M  |
|------|-----|-----|-----|----|
| SMD0 | OFF | ON  | OFF | ON |
| SMD1 | OFF | OFF | ON  | ON |

As previously described, the symbols indicate the following exposure modes:

P: Programmed exposure mode
A: Aperture-priority automatic exposure mode
S: Shutter-priority automatic exposure mode
M: Manual exposure mode The selection of the exposure mode is established by the operation of the exposure mode selecting ring 11, which has a lower surface forming a cam 11b. The cam faces the upper surface of the support member 47 so that, when the ring 11 is turned in the desired direction, the pins 48a and 48b are depressed or released. FIG. 8 shows, as an example, such a condition that only a pin 48a is depressed by the cam 11b and, accordingly, the switch SMD0 is turned off, while the other switch SMD1 is turned on. Therefore, as shown in Table 1, the exposure mode in FIG. 8 shows the shutter-priority automatic exposure mode.

The shaft 59 has an upper flange portion 59a which engages with a shoulder portion 11c formed in the inner surface of the ring 11, and a pair of legs 59b extending downwardly to be inserted into the notches 47b of the opening 47a of the support member 47 and secured thereto. A pair of holes 11d are formed at diametrically opposite positions in the shoulder portion 11c of the ring 11 in order to accommodate springs 61 and click balls 63 upwardly urged by the springs 61. Meanwhile, the flange portion 59a of the shaft 59 has four click recesses 59c which are equally spaced and associate with the click balls 63. Namely, the ring 11 can be turned and stopped in four rotational positions such that the click balls 63 disengage from and engage with the recesses 59c.

The liquid crystal display unit 12, exposure value adjusting unit 56 and exposure mode selecting unit 57 are assembled in turn in the following manner.

The liquid crystal display unit 12 is first assembled and subsequently secured to the frame 26 by means of the set screws 62. Next, the exposure value adjusting unit 56 and the exposure mode selecting unit 57 are assembled together on the upper cover 2 which is separated from the frame 26. In this case, the liquid crystal display unit 12 mounted on the frame 26 is inspected and adjusted independently from the other units. Meanwhile, the exposure value adjusting unit 56 and the exposure mode selecting unit 57 assembled together on the upper cover 2 are inspected and adjusted independently from the liquid crystal unit 12. Finally, the upper cover 2 with the exposure value adjusting unit 56 and exposure mode selecting unit 57 are fixed to the frame 26 with the display unit 12.

With the construction as described above, when the ring 11 is turned together with the index plate 65, the click balls 63 engage with the recesses 59c at each right angle rotation of the ring 11 to stop the rotation. When the ring 11 is located at one of the stopped positions, one of the index letters "P", "A", "M"and "S" faces the pointer 12a. By operating the adjusting ring 13 and adjusting knob 10, the shutter speed and F number can be adjusted respectively and respectively displayed in the liquid crystal panel 33 under "M" mode. Under "S" and "A" mode, the shutter speed and the aperture value can be adjusted by operating the adjusting ring 13 and knob 10 respectively, and displayed in the panel 33. Since the display unit 12 is completely independent from the rings 11 and 13, both the configuration of the liquid crystal panel 33 and the opening 35a of the pressing plate 35 can be formed as desired.

Figure 9:
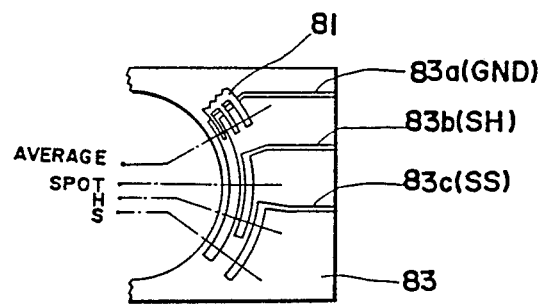
FIG. 9 is an enlarged top plan view showing switches included in a light metering mode selecting device shown in FIGS. 1 and 2.
Figure 10:
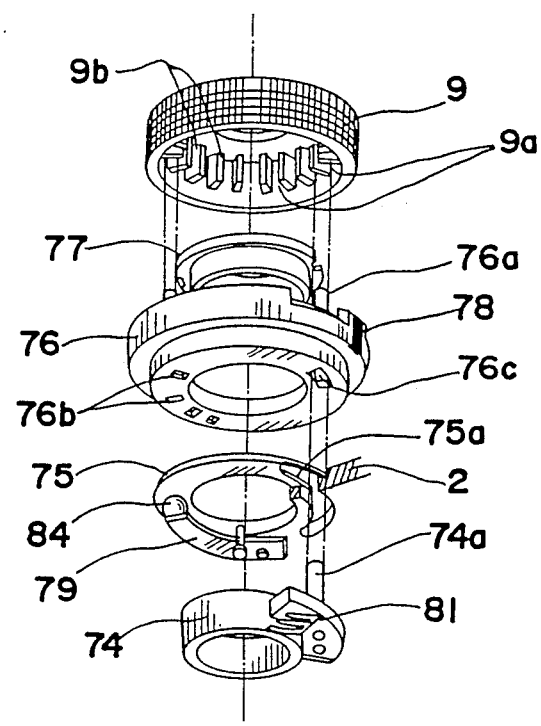
FIGS. 10 and 11 are, respectively, an exploded perspective view and an assembled sectional view of the light metering mode selecting device.
Figure 11:
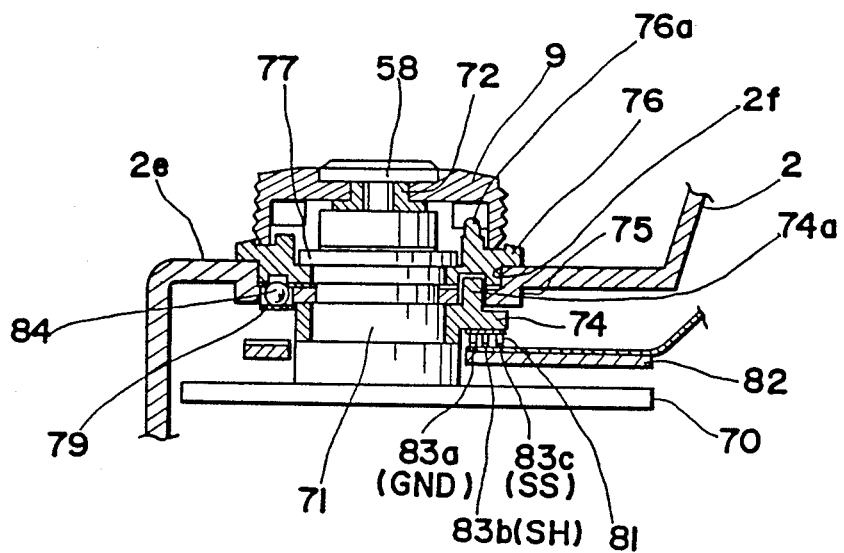

Subsequently, the light metering mode selecting unit 59 will be described in detail hereinafter with reference to FIGS. 9 and 10.

The light metering mode selecting unit includes a base plate 70 which is secured to the frame 26 and on which the knob 9 is rotatably mounted by means of a shaft 71 which upwardly extends through an opening formed in the upper cover 2. The shaft 71 is provided, at the upper end portion thereof, with a collar 72 on which the knob 9 is mounted. The knob 9 is rotatably mounted at the upper end portion of the shaft 71 by means of a set screw 58.

Around the shaft 71 are mounted, upwardly in turn, a switch holder 74 of sleeve type, a click ball support 75, a light metering mode selecting ring 76 and a nut 77 which fixes these members 74, 75 and 76 to the shaft 71. The ring 76 is rotatably inserted in the opening of the upper cover 2.

The knob 9 has a row of projections 9b arranged on the inner surface thereof to define a plurality of groves 9a therebetween. Meanwhile, the ring 76 has a projection 76a upwardly extending to be disengageably inserted into the desired grooves 9a. Accordingly, the ring 76 can be turned together with the knob 9.

The ring 76 has a pointer 78 at a predetermined position of the upper and outer surfaces thereof. When the pointer 78 faces one of the index letters indicated on the top surface 2e of the upper cover 2, for example, "AVERAGE", the average metering mode is selected.

As shown in FIG. 2, in this embodiment, the rotational angle of the knob 9 and, hence, the ring 76 between "AVERAGE" and "SPOT" is larger than that between "SPOT" and "H", and that between "H" and "S". Accordingly, the operational feeling of turning the ring 76 from the point "AVERAGE" to the point "SPOT" is quite different from that of turning the ring 76 from the point "SPOT" to the point "H" and that of turning the ring 76 from the point "H" to the point "S". Therefore, even if an operator operate the knob 9 without seeing it, he can correctly understand the condition of the ring 76.

The click ball support 75 is located below the upper cover 2 and provided with a ball 84 and a leaf spring 79 for receiving and upwardly urging the ball 84 into one of the four click recesses 76b formed in the lower surface of the ring 76. The click recesses 76b are arranged such that, when the pointer 78 faces each of the stop positions "AVERAGE", "SPOT", "H"and "S", the click ball 84 resiliently engages with the corresponding click recesses 76b. In addition, the click recess 76b corresponding to the point "AVERAGE" is preferably so designed that the engaging force of the ball to the recess corresponding to the point "AVERAGE" is larger than that of the ball to the other recesses, so that the knob 9 can be correctly operated depending on the difference of the operating feeling.

The switch holder 74 has a projection 74a which extends upwardly through a slit 75a formed in the click ball support 75 to engage with a hole 76c formed in the ring 76. Accordingly, the switch holder 74 can be turned together with the ring 76.

Between the switch holder 74 and the base plate 70 and around the shaft 71 is interposed a circular end portion of a flexible printed circuit board 83, on the lower surface of which a back support plate 82 is secured. Meanwhile, the switch holder 74 is provided with a brush 81. As best shown in FIG. 9, the board 83 is provided with three contacts 83a, 83b and 83c which cooperate with the brush 81 and form switches SH and SS. The contact 83a is grounded. That is to say, when the ring 76 is located at the stop point "AVERAGE", as shown in FIG. 9, the brush 81 only connects with the contact 63a. Accordingly, both switches SH and SS are turned off. Furthermore, when the brush 81 is located at the stop point "SPOT", the switch SH is turned on, but the other switch SS is turned off. When the brush 81 is located at the stop point "H", both switches SH and SS are on. When the brush 81 is located at the stop point "S", the switch SH is turned off, but the other switch SS is on.

Figure 12:
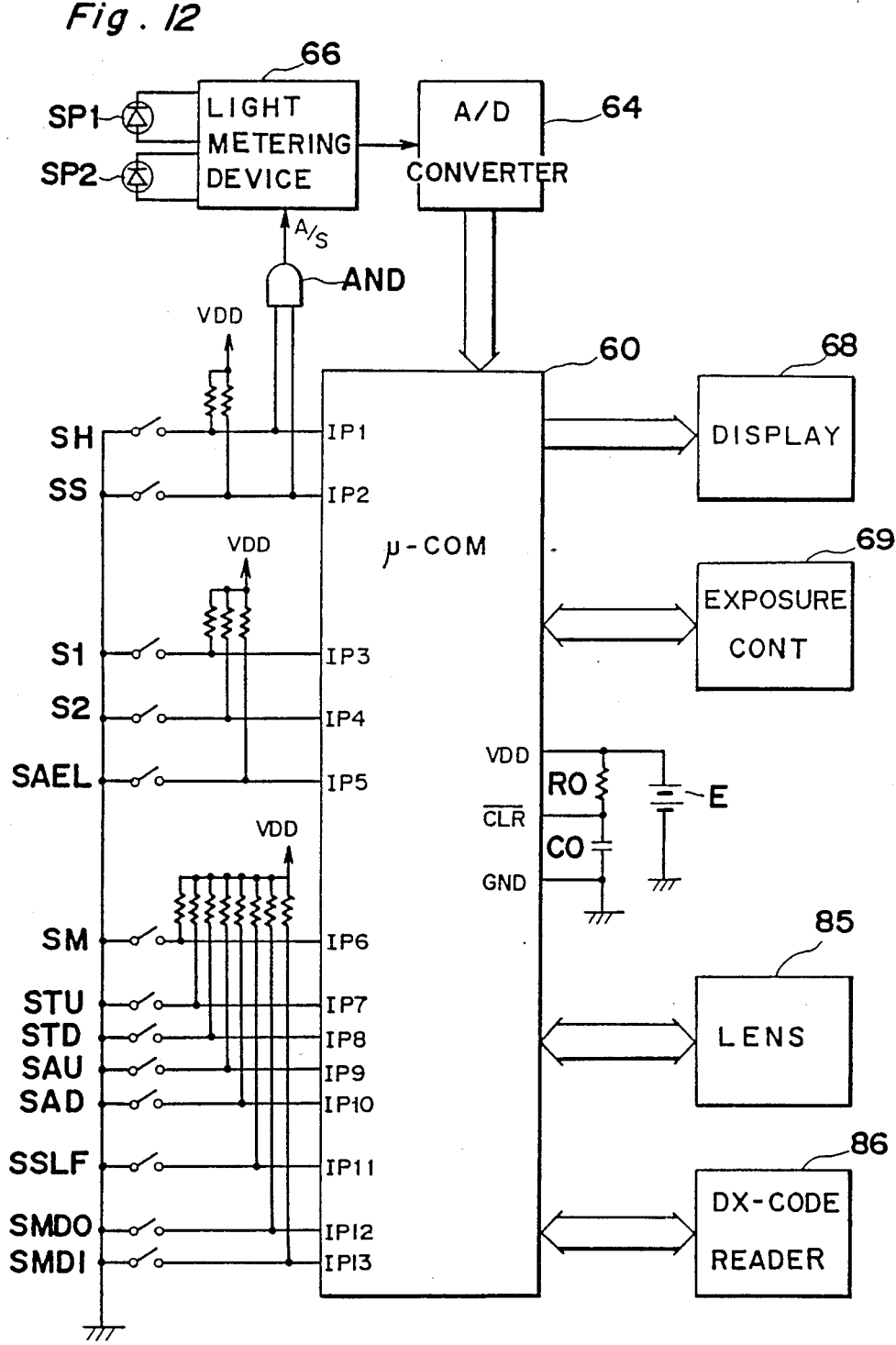
FIG. 12 is a control circuit for controlling the exposure contrOl device, light metering control device, etc.

FIG. 12 shows a control circuit of the camera, as described above, which controls the sequential operation.

Resistors RO and CO define a power up clear circuit. When a battery E is mounted on the camera, the voltage at a terminal CLR becomes instantly becomes low level. Subsequently, in response to the positive edge of the voltage at the terminal CLR, a microcomputer 60 is reset and starts its operation. The resistors, except one resistor RO, as shown in FIG. 12, are made from pull-up resistors.

An average light metering element SP1 and a spot light metering element SP2 are respectively connected to a light metering device 66 which includes head amplifiers respectively connected to the elements SP1 and SP2. The output signals from both amplifiers in the light metering device 66 are selectively fed to an A/D converter 64, depending on an A/S signal representing the average metering or spot metering. The A/D converter 64 converts the analog signals from the light metering device 66 to the digital signals which are applied to the microcomputer 60. A display device 68 displays for example, shutter speed and F number on the basis of the signals transmitted from the microcomputer 60. An exposure control device 69 controls, for example, the shutter speed, the aperture and up and down operation of the reflection mirror and exchanges the data with the microcomputer 60. From the lens 85 to be mounted to the camera are transmitted the F number at open aperture (Av(0)) and minimum F number (Av(max)). A DX-code reader 86 reads the sensitivity of the film to be inserted in the camera and transmits it to the microcomputer 60.

Reference symbols IP1 to IP13 indicate the input ports of the microcomputer 60. The switches SH and SS are respectively connected to the input ports IP1 and IP2 and also to an AND gate. The A/S signal is supplied from the AND gate to the light metering device 66, as previously described. The light metering mode is selected by the combination of the operation of the switches SH and SS. Namely, when either one of switches SH or SS is turned on, the output signal from the spot light metering element SP2 is selected by the A/S signal and supplied to the A/D converter 64. Meanwhile, when both switches SH and SS are turned off, the output signal from the average light metering element SP1 is selected. In the spot light metering mode, when the switch SH is turned on, namely when the highlight mode is selected, the lighting value obtained by the spot light metering element SP2 is shifted to the lower value to a predetermined extent in the microcomputer 60. Meanwhile, when the switch SS is turned on, namely when the shadow mode is selected, the lighting value obtained by the spot light metering element SP2 is shifted to the higher value to a predetermined extent in the microcomputer 60.

A light metering start switch S1 is connected to the input port IP3. A shutter release switch S2 is connected to the input port IP4. AE lock switch SAEL is connected to the input port IP5. As long as the lock switch SAEL is maintained on during the spot metering, the lighting value is shifted.

The main switch SM and a self-timer switch SSLF are respectively connected to the input ports IP6 and IP11. A shutter speed (Tv) up switch STU, shutter speed down switch STD, aperture (Av) up switch SAU and aperture down switch SAD are respectively connected to the input ports IP7, IP8, IP9 and IP10. The exposure mode selecting switches SMD0 and SMD1, as previously described, are respectively connected to the input port IP12 and IP13.

Figure 13A:
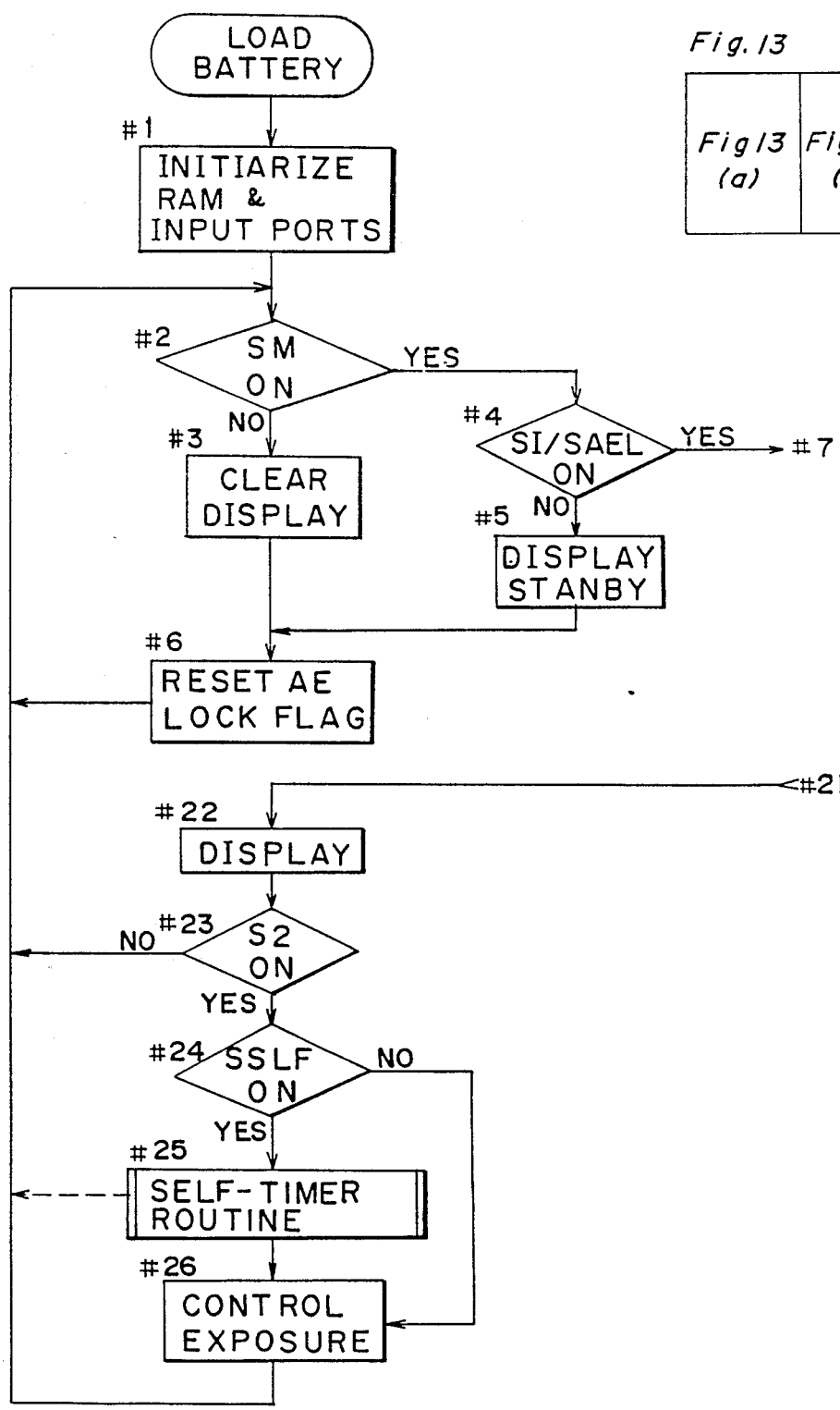
FIGS. 13a and 13b, taken together as shown in FIG. 13, show a flow chart of the operation of a microcomputer included in the control circuit as shown in FIG. 12.
Figure 13A:
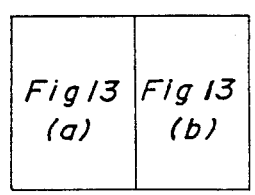
Figure 13B:
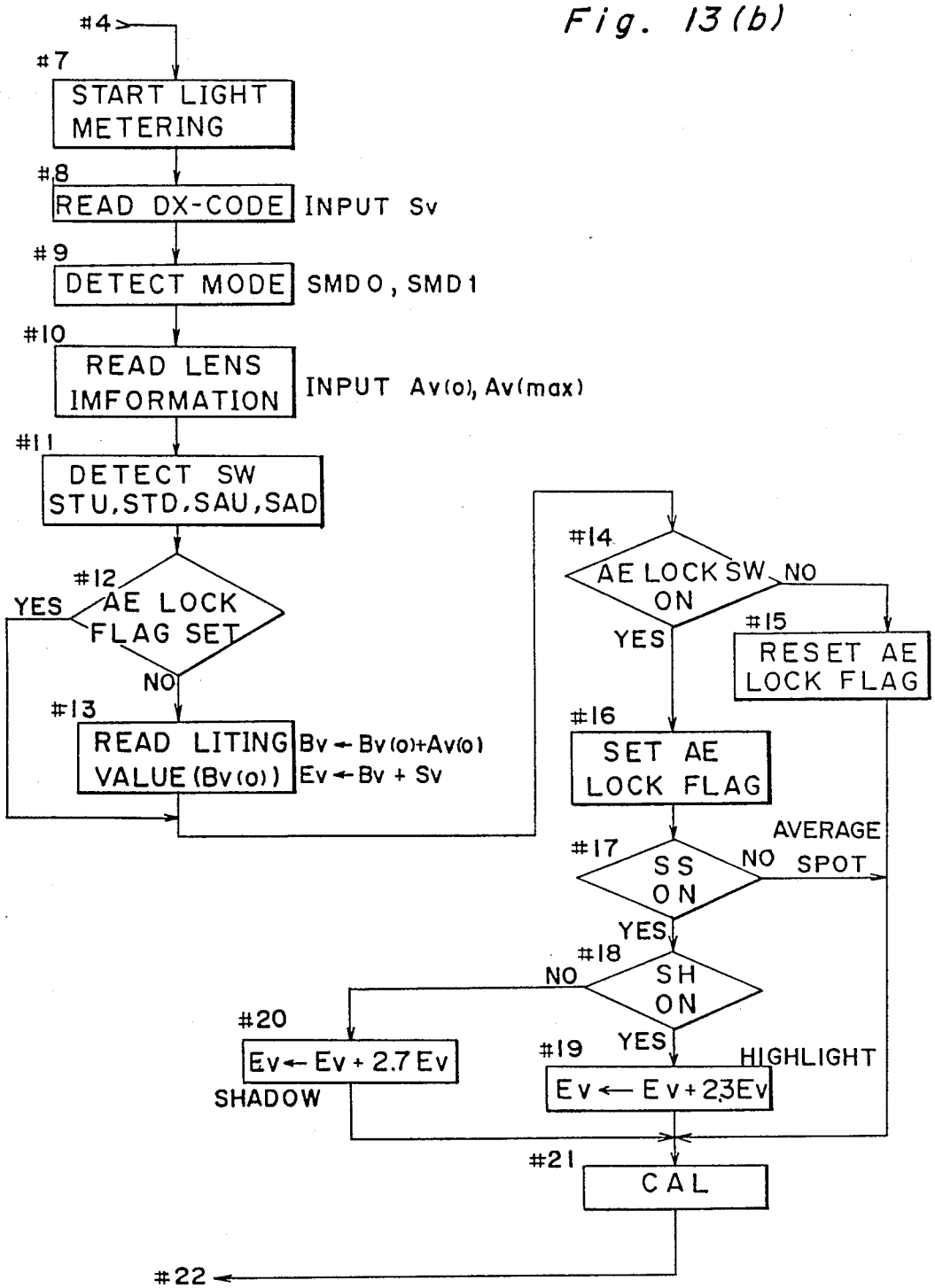

The following is the description on the operation of the control circuit given in connection with the flow chart as shown in FIGS. 13a and 13b.

A battery is first mounted into the camera. Then, at step #1, the input ports and RAM in the microcomputer 60 are initialized. Step #2 detects whether or not the main switch SM is on. If not, the program goes to step #3 to clear the display of the display device 68, and then it goes to step #6. On the contrary, if yes, the program goes to step #4 to detect whether or not the light metering start switch S1 and AE lock switch SAEL are on. If yes, that is, at least one of the switches S1 and SAEL is on, the program goes to step #7. On the contrary, if not, that is, if both switches S1 and SAEL are off, the program goes to step #5 to display a standby on the display device 68, and then, it goes to step #6. At step #6, the AE lock flag is reset. From step #6, the program returns to step #2.

At step #7, the light metering is started, and then, the program goes to step #8. At step #8, the DX-code (Sv) representing film sensitivity, of a film cartridge mounted into the camera is read in the DX-code reader 86. The output information representing DX-code is fed from the reader 86 into the microcomputer 60. If the film cartridge has no DX-code, the film sensitivity is set at ISO 100. Then, the program goes to step #9 to detect the exposure mode, i.e. the condition of the switches SMD0 and SMD1, and then it goes to step #10. At step #10, the F number at open aperture (Av(0)) and minimum aperture (Av(max)) fed from the lens 85 are read in the computer 60, and then, the program goes to step #11. At step #11, the condition of the switches STU, STD, SAU and SAD are detected to adjust the shutter speed and F number according to the exposure mode and the type of lens 85 to be selected, and then, the program goes to step #12.

At step #12, it is detected whether or not the AE lock flag is set. If not, the program goes to step #13 to read the luminance value (Bv(0)) and also to calculate the exposure value (Ev) by adding the luminance value (Bv(0)), aperture value at open aperture (Av(0)) and the value of the film sensitivity (Sv), and then, it goes to step #14. On the contrary, if yes, the program goes to step #14.

Step #14 detects whether or not the AE lock switch SAEL is on. If not, the program goes to step #15 to reset the AE lock flag, and then, it goes to step #21. On the contrary, if yes, the program goes to step #16 to set the AE lock flag, and then it goes to step #17. Step #17 detects whether or not the switch SS is on. If not, that is, if the average light metering mode or normal shadow light metering mode is detected, the program goes to step #21. On the contrary, if yes, the program goes to step #18 to detect whether or not the switch SH is on. If not, that is, if the shadow mode is detected, the program goes to step #20 to add 2.7Ev to Ev, and then it goes to step #21. When the shadow mode is selected, the exposure value (Ev) calculated in step #13 is biased toward the over-exposure. On the contrary, if yes, that is, if the highlight mode is selected, the program goes to step #19 to subtract 2.3Ev from Ev, and then, it goes to step #21. When the highlight mode is selected, the exposure value (Ev) is biased toward the under-exposure.

Step #21 calculates the shutter speed (Tv) and/or aperture(Av) and, hence, F number (Av) by using the exposure value (Ev) obtained in steps #8, #13, #19 and #20 and manually selected value (Av or Tv) according to the exposure mode detected in step #9, and then, it goes to step #22 to display the value (Tv) and (Av) in the display device 68, and then it goes to step #23.

Step #23 detects whether or not the shutter release switch S2 is on. If not, the program returns to step #2, and then steps #2 to #23 are repeated. On the contrary, if yes, the program goes to step #24 to detect whether or not the self-timer switch SSLF is on. If the switch SSLF is off, the program goes to step #26 to control the exposure so as to permit the light passing through the lens onto the film. After step #26, the program returns to step #2, and then, the routine described above is repeated. On the contrary, if the switch SSLF is on, the program goes to step #25 at which a subroutine or self-timer routine is carried out. At the subroutine 25, the light metering, calculation and display are carried out, as described above, for a period of time, for example, ten seconds, as set by the self-timer and includes steps #8, #9, #10, #13, #14, #17, #18, #19, #20, #21 and #22 as described above. It is to be noted that, at step #14 of this subroutine 25, the AE lock flag is detected instead of the AE lock switch and also it is detected whether or not the main switch SM is on. If the main switch SM is turned off, the program returns to step #2 to reset the self-timer. After carrying out this operation for ten seconds, the program goes to step #26.

With the embodiment of the present invention, since the light metering modes can be independently selected by the operation of the ring 76, the operator can continuously take a plurality of pictures at each mode. Namely, it is not necessary to operate the light metering mode selection ring or knob as long as the mode is not changed.

Furthermore, since the highlight and shadow based light metering modes are selected and simultaneously the exposure value under the highlight and shadow based light metering modes is fixed only during the time when the AE lock button 17 of the AE lock switch SAEL is pushed, the subject to be spot-metered can be easily changed many time by only pushing and releasing the AE lock button.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A camera which comprises:
   a releasing means for starting photographing operation;
   an exposure mode selecting member arranged on a first upper portion of the camera close to said releasing means so as to be manually operated in order to set an exposure mode without assistance of other manually operated means, said exposure mode being selected from a program mode in which an aperture value and a shutter speed are controlled by the camera and a manual set mode in which at least one of the aperture value and the shutter speed is manually set by a photographer; and
   a light metering mode selecting member arranged on a second upper portion of the camera opposite to said first upper portion with respect to a pentagonal roof prism portion of the camera so as to be manually operated in order to select a light metering mode from a spot metering mode and an average metering mode.

2. A camera as claimed in claim 1, wherein at least one of the exposure mode selecting member and light metering mode selecting member is made of a ring which is manually turned.

3. A camera comprising:
   a light metering mode selecting device for selecting one of a plurality of light metering modes including at least high light based light metering mode and shadow based bight metering mode;
   a selecting member which constitutes a part of said selecting device for changing over the light metering mode between said highlight based metering mode and said shadow based light metering mode, said selecting member being movably supported so that said selecting member can be selectively positioned at positions corresponding to respective light metering modes; and
   said selecting device preserving a selected light metering mode until the mode is changed over by an operation of said selecting member, said selecting device selects one of said light metering modes corresponding to the position of said selecting member.

4. A camera as claim in claim 1, further comprising an exposure value setting member provided on said first upper portion.

5. A camera as claimed in claim 4, wherein said exposure value setting member is so arranged as to set an aperture value of a taking lens.

6. A camera which comprises:
   a light metering mode selecting device for selecting one of a spot light metering mode and a highlight based light metering mode;
   an AE lock switch mounted in the camera body and having a knob to be manually operated; and
   a light metering control circuit, wherein the light metering control circuit is so designed that, when the light metering mode selecting deice selects highlight based light metering mode and the knob of the AE switch is not operated, the light metering mode is set at the spot light metering mode, and when the light metering mode selecting device selects the highlight based light metering mode and when the knob of the AE lock switch is operated, the metered level is shifted for setting the light metering mode at the highlight metering mode.

7. A camera which comprises:
   a light metering mode selecting device for selecting one of a spot light metering mode and a shadow based light metering mode;
   an AE lock switch mounted in the camera body and having a knob to be manually operated; and
   a light metering control circuit operating such that when the light metering mode selecting device selects a shadow based light metering mode and the knob of the AE switch is not operated, the light metering mode is set at the spotlight metering mode, and when the light metering mode selecting device selects the shadow base based light metering mode and when the knob of the AE lock switch is operated, the metered level is shifted for setting the light metering mode at the shadow based light metering mode.

* * * * *